March 16, 1948. R. S. WYETH 2,437,845
WINDSHIELD COVER
Filed April 7, 1945
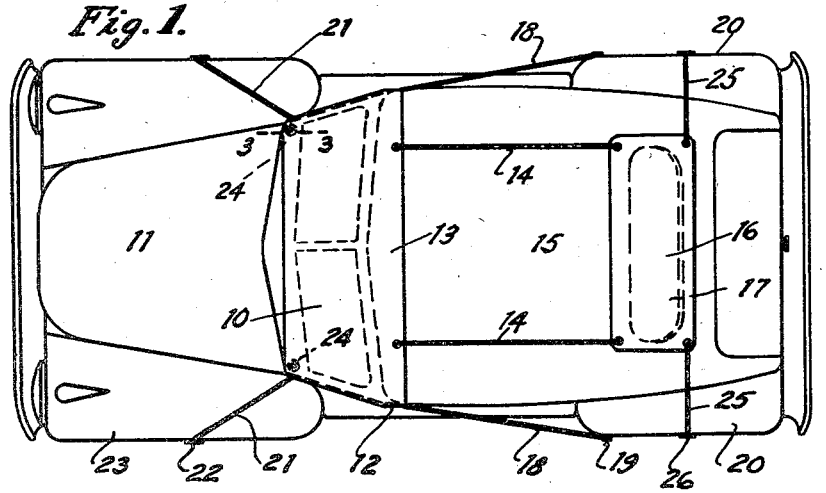
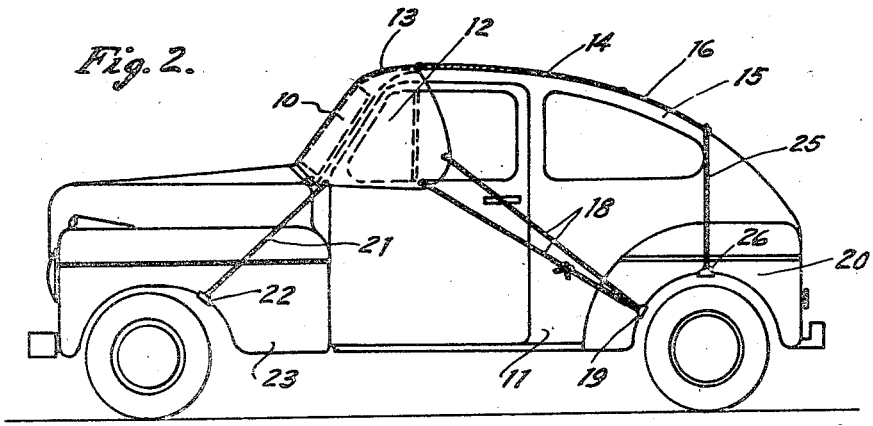
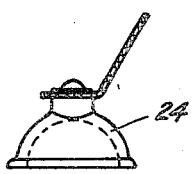
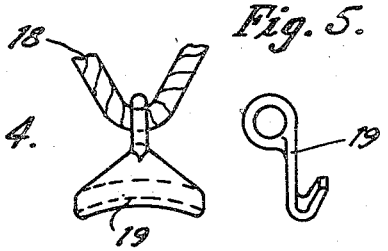
Inventor
Ralph S. Wyeth.
By H. S. McDowell
Attorney Patented Mar. 16, 1948

2,437,845

UNITED STATES PATENT OFFICE 2,437,845

WINDSHIELD COVER

Ralph S. Wyeth, Newark, Ohio

Application April 7, 1945, Serial No. 587,145

5 Claims. (Cl. 296—84)

The present invention provides a readily attachable protective covering or tarpaulin for the windshield and other windows of motor vehicles.

When motor vehicles are left unattended for relatively extended periods of time in locations exposed to the action of the elements, as when a car is parked outdoors over night during winter weather, its windshield and other glazed windows frequently accumulate deposits of snow, frost and other forms of moisture which require removal before the car can be driven with safety. Often the removal of such deposits is a matter requiring considerable toil, time and effort, even when defrosting heaters are available, since in modern motor vehicle body design, sloping windshields and other windows are disposed in such angular relationship to the vehicle that the same offer projecting surfaces on which snow, ice and frost readily accumulate. This condition constitutes a real problem for many motorists, who do not find convenient garage facilities readily available and are compelled to park their motor vehicles out-of-doors.

In an effort to prevent the deposit of atmospheric precipitates on windshield surfaces and the like, many motorists resort to the practice of placing paper sheets over the windshields and attempt to retain the same thereon by clamping such sheets between the windshield and its moisture-removing wipers. Such an expediency is not always reliable since the winds tend to blow the sheets from their applied positions. Also in the patented art, it has been proposed to attach a fabric protector to windshields with the use of marginal tapes engaged with the projecting door hinges of a vehicle body, or wherein the receiving tapes are adapted to be wedged between the swinging body doors and the frames therefor. Such proposals fail to provide an efficient securing means for such protecting covers to the extent that the latter may be positively maintained in their positions of application during storms, high winds and the like, and for these and other reasons, such as convenience in application and removal, have not generally been used by motorists, although there is a decided need for the same.

Therefore, it is an object of the present invention to provide a moisture-repellent flexible covering for the windshield and other windows of a closed motor vehicle body, and one wherein improved fastening means are provided for conveniently attaching, yet positively retaining the covering in its position of application, so that the same will not be dislodged by the action of the elements and generally will be more reliable and efficient in its intended capacities than constructions hitherto provided.

It is another object of the invention to provide a covering of the character set forth which is adapted to be held in its applied position through the use of a novel arrangement of securing cables, the latter having removable attachment with the marginal edges of the fenders of the associated vehicle, and are so formed as to apply strong tensioning forces to the covering, whereby to maintain the latter in a taut and firm position of application over the windshield and at least partly over the side windows of the vehicle.

A further object is to provide a protector of this nature in which provision is made for covering the rear window of the vehicle body as well as the windshield and side windows thereof.

Still, a further object is to provide a fabric water-repellent window covering for motor vehicles which, when not in use, may be stored compactly in one of the luggage compartments of the associated vehicle.

For a further understanding of the invention, and additional objects and advantages thereof, reference is to be had to the following description and the accompanying drawings, wherein:

Fig. 1 is a top plan view of a motor vehicle and showing applied thereto the windshield and window protective covering forming the present invention;

Fig. 2 is a side elevational view;

Fig. 3 is a detail sectional view on the line 3—3 of Fig. 1 and showing one of the attaching suction cups;

Fig. 4 is a detail front elevational view of one of the fender engaging cable hooks;

Fig. 5 is an edge elevational view of said hook.

The improved protective covering for automobile windshields comprising the present invention consists primarily of a flexible sheet 10 of material of a water-impervious or repellent nature, such as duck, canvas, rubberized fabric, oilcloth or the like. The sheet is shaped so that preferably it covers the entire outer surface of the windshield of a motor vehicle 11 and will extend around the sides of the vehicle body, as at 12, so as to cover the side ventilating windows of the body and the forward part of the vehicle top, as at 13. While the side extensions have been shown as only partly covering the side windows of the vehicle body, it will be understood that such extensions may be of sufficient size to completely cover the side windows if so desired.

Also, in a preferred embodiment of the invention, the sheet 10 is connected by means of cables 14 which extend over the top 15 of the motor vehicle to a rear cover sheet 16, which may be formed of the same materials as the main sheet 10 and which, when in use, will cover the back window 17 of the vehicle body. To provide for the convenient but secure attachment of such a covering in its position of application on the vehicle body, the side extensions 12 thereof have joined with their vertical marginal edges the ends of a pair of cables 18. The intermediate portion of each of these cables carries a hook-shaped fitting 19 which is formed to engage the edge of a rear vehicle fender 20. The cables 18 have a certain inherent amount of stretch or resiliency in the same, so that when the fittings 19 are applied to the fender, as shown in Fig. 2, the sheet 10 will be firmly and securely maintained in its active position protecting the front of the vehicle body. In addition to the rearwardly extending cables 18, I may attach to each of the side extensions 12 a forwardly and downwardly directed cable 21, carrying hook-shaped fittings 22 at their outer or lower ends for connection with the edges of the forwardly disposed vehicle fenders 23.

The lower marginal edge of the sheet 10 may be provided with inwardly directed suction cups 24 formed of a flexible material, such as rubber, which may be forced into adhering association with the outer cowling of the vehicle body to prevent the sheet from lifting or slipping under the action of strongly applied wind forces. When the rear window cover 16 is used, the same may be retained in its active position by the employment of a pair of cables 25, whose outer ends carry hook-shaped fasteners 26 adapted for connection with the edges of the rear fenders 20.

Consideration will disclose that the present invention provides a protective covering for the glazed windows of a motor vehicle body which may be readily applied in its operative position on the vehicle body and held against dislodgment by the use of the quickly fastened cables. The latter do not require the use of threaded fastening elements or other movable parts which may be difficult to actuate, particularly in periods of cold weather, or which require some considerable time to fasten or release the same. In the present construction, after the cover has been fitted over the windshield and around the side windows, it is merely necessary to slightly stretch the cables and connect the fasteners carried thereby with the fender edges. These operations may be performed in a few minutes with gloved hands and without physical discomfort on the part of the motorist. Similar convenience is obtainable in the removal of the cover. When removed, the cover may be compactly folded and placed in one of the customary storage compartments of a vehicle body.

I claim:

1. A windshield protector comprising a flexible cover sheet of the size adapted to extend completely over the outer surfaces of a motor vehicle windshield and at least partially the side windows of a motor vehicle, fastening cables extending rearwardly from the sides of said cover sheet, and fastening means carried by the ends of said cables for detachably connecting the same with the rear wheel fenders of an associated vehicle.

2. A windshield protector comprising a flexible cover sheet of the size adapted to extend completely over the outer surfaces of a motor vehicle windshield and at least partially the side windows of a motor vehicle, fastening cables extending rearwardly from the sides of said cover sheet, hook devices carried by the ends of said cables for detachably connecting the same with the rear wheel fenders of an associated vehicle, and additional fastening cables connected with said cover sheet and extending forwardly therefrom, and means carried by the forward ends of said last-named cables adapted for detachable connection with the front wheel fenders of said vehicle.

3. A windshield protector comprising a flexible cover sheet of the size adapted to extend completely over the outer surfaces of a motor vehicle windshield and at least partially the side windows of a motor vehicle, fastening cables extending rearwardly from the sides of said cover sheet, means carried by the ends and adapted for detachably connecting said cables with the rear wheel fenders of an associated vehicle, and suction cup devices carried by the forward lower edge portions of said cover sheet and adapted for removable adhering engagement with the front cowling of the motor vehicle.

4. A windshield protector comprising a flexible cover sheet of the size adapted to extend completely over the outer surfaces of a motor vehicle windshield and at least partially the side windows of a motor vehicle, fastening cables extending rearwardly from the sides of said cover sheet, means carried by the ends and adapted for detachably connecting said cables with the rear wheel fenders of an associated vehicle, additional fastening cables connected with said cover sheet and extending forwardly therefrom, means carried by the ends of said last-named cables and adapted for detachable connection with the front wheel fenders of said vehicle, and suction cup devices carried by the forward lower edge portions of said cover sheet and adapted for removable adhering engagement with the front cowling of the motor vehicle.

5. A motor vehicle tarpaulin comprising a flexible body and water-repellent material shaped for application over the top and front windshield of a motor vehicle and extended at the ends thereof to at least partially cover the side windows of the vehicle, a rearwardly directed extension formed with said body for application over the rear windows of the associated vehicle, cable means connected with and adapted to extend forwardly and rearwardly from said body and means carried by the ends of said cable and engageable with the fender structure of the vehicle for retaining said body and its extension in a taut position of application over the windshield and windows of said vehicle.

RALPH S. WYETH.

REFERENCES CITED

The following references are of record in the file of this patent:

UNITED STATES PATENTS

| Number | Name | Date |
|---|---|---|
| 2,065,242 | Omerly, Jr. | Dec. 22, 1926 |
| 2,223,145 | Wise | Nov. 26, 1940 |
| 2,331,600 | Dillow | Oct. 12, 1943 |